US012798432B2

(12) United States Patent
Zhang et al.

(10) Patent No.: US 12,798,432 B2
(45) Date of Patent: Nov. 17, 2026

(54) ELASTIC MEMBER, LIMITING MEMBER, LIMITING GUIDE DEVICE, AND ELECTRIC AUTOMOBILE COMPRISING SAME

(71) Applicants: AULTON NEW ENERGY AUTOMOTIVE TECHNOLOGY GROUP, Guangzhou (CN); SHANGHAI DIANBA NEW ENERGY TECHNOLOGY CO., LTD., Shanghai (CN)

(72) Inventors: Jianping Zhang, Shanghai (CN); Chunhua Huang, Shanghai (CN)

(73) Assignees: AULTON NEW ENERGY AUTOMOTIVE TECHNOLOGY GROUP, Guangzhou (CN); SHANGHAI DIANBA NEW ENERGY TECHNOLOGY CO., LTD., Shanghai (CN)

( * ) Notice: Subject to any disclaimer, the term of this patent is extended or adjusted under 35 U.S.C. 154(b) by 940 days.

(21) Appl. No.: 18/019,250

(22) PCT Filed: Aug. 4, 2021

(86) PCT No.: PCT/CN2021/110497
§ 371 (c)(1),
(2) Date: May 9, 2023

(87) PCT Pub. No.: WO2022/033368
PCT Pub. Date: Feb. 17, 2022

(65) Prior Publication Data

US 2023/0294548 A1 Sep. 21, 2023

(30) Foreign Application Priority Data

Aug. 10, 2020 (CN) ........................ 202010795071.0

(51) Int. Cl.
*B60L 53/80* (2019.01)

(52) U.S. Cl.
CPC .................................. *B60L 53/80* (2019.02)

(58) Field of Classification Search
CPC .............. B60K 1/04; B60K 2001/0438; B60K 2001/0455; B60K 2001/0472; B60L 53/80
See application file for complete search history.

(56) References Cited

U.S. PATENT DOCUMENTS 5,760,569 A * 6/1998 Chase, Jr. ........... H01M 50/204 414/281
8,237,403 B2 * 8/2012 Ishii .................... H01M 10/488 320/112

(Continued)

FOREIGN PATENT DOCUMENTS

CN 105216645 A 1/2016
CN 205255985 U 5/2016

(Continued)

OTHER PUBLICATIONS

Oct. 25, 2021 International Search Report issued in International Patent Application No. PCT/CN2021/110497.

(Continued)

*Primary Examiner* — Katy M Ebner

(57) ABSTRACT

Provided are an elastic member, a limiting member, a limiting guide device, and an electric automobile comprising same. The limiting guide device comprises an elastic member (201) and a limiting member (101) which match each other. The elastic member (201) is fixed to an inner side wall of a quick-change support (200) of the electric automobile or an outer side wall of a quick-change battery box (100) of the electric automobile, and the elastic member (201) is used for elastically limiting the movement of the quick-change battery box (100) in the quick-change support (200). The elastic member (201) can elastically limit the movement of the (Continued)

quick-change battery box (100) in the quick-change support (200), thereby preventing the battery box (100) from being damaged.

14 Claims, 16 Drawing Sheets

(56) References Cited

U.S. PATENT DOCUMENTS

| | | | | |
|---|---|---|---|---|
| 8,852,794 | B2 * | 10/2014 | Laitinen | H01M 50/204<br>429/149 |
| 9,358,895 | B2 * | 6/2016 | Avganim | B60K 1/04 |
| 9,812,684 | B2 * | 11/2017 | Smith | H01M 50/24 |
| 2017/0334279 | A1 * | 11/2017 | Higuchi | B60L 50/66 |
| 2019/0006652 | A1 * | 1/2019 | Kim | H01M 50/211 |
| 2019/0305274 | A1 * | 10/2019 | Iida | B62D 21/152 |
| 2021/0104716 | A1 * | 4/2021 | Shieh | H01M 50/20 |
| 2023/0061386 | A1 * | 3/2023 | Gil | F25D 11/003 |

FOREIGN PATENT DOCUMENTS

| | | |
|---|---|---|
| CN | 209313885 U | 8/2019 |
| CN | 110752326 A | 2/2020 |
| CN | 110816242 A | 2/2020 |
| CN | 213138545 U | 5/2021 |

OTHER PUBLICATIONS

Oct. 25, 2021 Written Opinion of the International Searching Authority issued in International Patent Application No. PCT/CN2021/110497.

Dec. 16, 2020 1st Chinese Notice of Correction issued in Chinese Patent Application No. 202021649581.9.

* cited by examiner

ELASTIC MEMBER, LIMITING MEMBER, LIMITING GUIDE DEVICE, AND ELECTRIC AUTOMOBILE COMPRISING SAME

The present application is a National Stage of International Application No. PCT/CN2021/110497, filed on Aug. 4, 2021, which claims the priority of Chinese patent application 2020107950710 filed on Aug. 10, 2020. The contents of the Chinese patent application are incorporated herein by reference in their entireties.

TECHNICAL FIELD

The present invention relates to the field of electric automobiles, especially to an elastic member, a limiting member, a limiting guide device and an electric automobile comprising same.

BACKGROUND

Currently, the emission of vehicle exhaust is still an important factor in environmental pollution, and in order to control vehicle exhaust, people have developed natural vehicles, hydrogen fuel vehicles, solar vehicles and electric automobiles to replace fuel vehicles. While one having the most application prospects among them is electric automobiles. Current electric automobiles mainly include two types: direct charge type and quick-change type.

Quick-change type electric automobiles do not need to be charged for a long time, after the battery is exhausted, the electric automobiles can continue driving by quickly replacing the battery pack, which is more suitable for public transportation.

There are currently two commonly used ways to replace the battery of the quick-change type electric automobile, one is to insert a quick-change battery box into a quick-change support of an electric automobile from the side of the electric automobile for mounting, one is to push a quick-change battery box from bottom to up into a quick-change support from the bottom orientation of an electric automobile, and fix it with the quick-change support. For the latter mounting method, when the quick-change battery box is assembled with the quick-change support from bottom to top, precise positioning is needed to prevent mounting failure. However, even if an accurate positioning between the quick-change battery box and the quick-change support is performed, in the actual mounting process, a small amount of deviation cannot be prevented when the quick-change battery box is inserted. Therefore, the quick-change battery box may still collide with the side wall of the quick-change support during a loading process, causing the quick-change battery box to be damaged.

In addition, when the quick-change battery box is mounted with the quick-change support, although sensors or the like will be applied to perform a positioning between the quick-change battery box and the quick-change support, when the quick-change battery box is loaded into the quick-change support, a positioning guide device is still needed to be applied for mechanically guiding the insertion of the quick-change battery box into the quick-change support.

CONTENT OF THE PRESENT INVENTION

A technical problem to be solved by the present invention is to provide an elastic member, a limiting member, a limiting guide device and an electric automobile comprising same in order to overcome the above-mentioned defects of the prior art.

The present invention solves the above technical problem through the following technical solutions:

An elastic member, the elastic member is fixed on an inner side wall of a quick-change support of the electric automobile or an outer side wall of a quick-change battery box of the electric automobile, and is used for elastically limiting the movement of the quick-change battery box in the quick-change support.

A technical effect of the solution is: the elastic member can elastically limit the movement of the quick-change battery box in the quick-change support, thereby preventing the battery box from being damaged.

Preferably, the elastic member comprises a mounting portion and a protruded portion, the mounting portion is used to mount the elastic member to the inner side wall of the quick-change support or the outer side wall of the quick-change battery box, and the protruded portion is extended and protruded relative to the mounting portion in a direction that is facing away from the inner side wall of the quick-change support or the outer side wall of the quick-change battery box.

A technical effect of the further solution is: the elastic member realizes its elastic cushioning function through the protruded portion, and the cushioning is more reliable.

Preferably, the protruded portion has an upper inclined surface and a lower inclined surface that are oppositely arranged, the upper inclined surface and the lower inclined surface are inclinedly arranged from a protruded end of the protruded portion toward the mounting portion.

A technical effect of the further solution is: realizing a better elasticity and guidance by the inclined surface.

Preferably, the protruded portion has a left inclined surface and a right inclined surface that are oppositely arranged, the left inclined surface and the right inclined surface are inclinedly arranged in a direction from the protruded end of the protruded portion toward the mounting portion.

A technical effect of the further solution is: realizing a better elasticity and guidance by the inclined surface.

Preferably, the elastic member comprises at least two of the protruded portions distributed along the vertical direction.

A technical effect of the further solution is: by arranging a plurality of protruded portions, the elasticity thereof can be better ensured.

Preferably, the mounting portion is disposed between two of the adjacent protruded portions.

A technical effect of the further solution is: by arranging the mounting portion between the protruded portions, the structure is simplified and the mounting is easy.

Preferably, at least one of an upper end and a lower end of the elastic member is a free end.

A technical effect of the further solution is: preventing an overpositioning of the elastic member.

Preferably, the elastic member further comprises a snap-fit portion, the snap-fit portion is disposed at the top or bottom of the elastic member, the snap-fit portion is used for snap-fitting with the inner side wall of the quick-change support or the outer side wall of the quick-change battery box of the electric automobile.

A technical effect of the further solution is: facilitating the mounting and positioning of the elastic member by the snap-fit portion.

Preferably, the snap-fit portion is formed as bending towards the inner side wall of the quick-change support of the electric automobile or the outer side wall of the quick-change battery box of the electric automobile.

A technical effect of the further solution is: providing a preferable way of snap-fitting.

Preferably, the elastic member is fixed to the inner side wall of the quick-change support or the outer side wall of the quick-change battery box of the electric automobile by means of a threaded member.

A technical effect of the further solution is: facilitating the fixture of the elastic member.

A limiting member, the limiting member is used to cooperate with the elastic member as described above, the elastic member is disposed to one between the inner side wall of the quick-change support and the outer side wall of the quick-change battery box, the limiting member is arranged to the other one between the inner side wall of the quick-change support and the outer side wall of the quick-change battery box.

A technical effect of the solution is: elastically limiting the movement of the quick-change battery box in the quick-change support, thereby preventing damage to the battery box.

Preferably, the limiting member comprises a positioning surface and a guide surface, the positioning surface is used to abut against the elastic member, the guiding surface extends and protrudes outward from the positioning surface.

A technical effect of the further solution is: facilitating to guide the elastic member by the guide surface.

Preferably, the limiting member comprises at least two of the guide surfaces, two of the guide surfaces are respectively oppositely disposed to the two sides of the positioning surface, and extend along the vertical direction, a sliding passage is formed between the guide surface and the positioning surface for the elastic member to slide into.

A technical effect of the further solution is: further facilitating to guide the elastic member by the guide surface.

Preferably, a connecting surface is disposed in between the guide surface and the positioning surface, and the connecting surface is a curved-shaped surface.

A technical effect of the further solution is: facilitating the manufacture.

A limiting guide device, which comprises the elastic member as described above and the limiting member as described above.

A technical effect of the solution is: the elastic member can the movement of the quick-change battery box in the quick-change support is elastically limited and guided, thereby preventing the battery box from being damaged.

A quick-change support, the inner side wall of the quick-change support is disposed with one or a plurality of the elastic members or the limiting members as described above.

A quick-change battery box, the outer side wall of the quick-change battery box is disposed with one or a plurality of the elastic members or the limiting members as described above.

An electric automobile, which comprises the quick-change support as described above and the quick-change battery box as described above, when the elastic member is disposed on one between the quick-change support and the battery box, the limiting member is disposed on the other one between the quick-change support and the battery box.

Preferably, when the quick-change battery box is loaded into the quick-change support, the elastic member is extruded by the limiting member to deform.

A technical effect of the further solution is: realizing an elastic limitation between the quick-change battery box and the quick-change support by means of the deformation of the elastic member.

Preferably, the pre-compressed dimension of the elastic member is e, the thickness of the elastic member is c, the groove depth of the limiting member is d, wherein, c=d+e.

Wherein, the pre-compressed dimension is the compressed dimension of the elastic member when the quick-change battery box is loaded into the quick-change support.

Preferably, a distance between the side edge of the elastic member and the guide surface is a reserved gap t, a width of the elastic member is a, a horizontal battery swapping stroke of the quick-change battery box is s, and a distance between the guide surfaces is b, b=a+2t+s.

A technical effect of the further solution is: when the quick-change battery box 100 is mounted to the quick-change support 200 and is horizontally locked, by means of the arrangement of b=a+2t+s, a collision or an interference from occurring between the elastic member 201 and the side wall portion 107 of the limiting member 101 can be prevented.

Preferably, when the quick-change battery box is loaded into the quick-change support, a gap between the outer side wall of the quick-change battery box and the inner side wall of the quick-change support is K, a thickness of the limiting member is F, and K−F is greater than 0 and less than 2.

A technical effect of the further solution is: reserving a gap between the quick-change battery box and the limiting member to prevent a collision or interference.

Preferably, the battery box is disposed with a lock shaft, the quick-change support is disposed with a lock base, inside of the lock base is disposed with a lock groove for engaging with the lock shaft, the lock groove comprises a rising section and a locking section, the locking section extends horizontally from the rising section toward the locking direction, when the lock shaft is located at the rising section, the distance between the elastic member and the guide surfaces of the limiting member facing to the locking direction is greater than the distance for the lock shaft moving from the rising section to a locked position in the locking section.

A technical effect of the further solution is: when the quick-change battery box is mounted to the quick-change support and is horizontally locked, preventing a collision or an interference from occurring between the elastic member and the side wall portion of the limiting member.

A positive progressive effect of the present invention is: the elastic member can elastically limit the movement of the battery box in the quick-change support, thereby preventing the battery box from being damaged. The limiting member, the limiting guide device, the quick-change support, the quick-change battery box, and the electric automobile have the above-mentioned same effect.

DESCRIPTION OF REFERENCE NUMERALS

Figure 1:
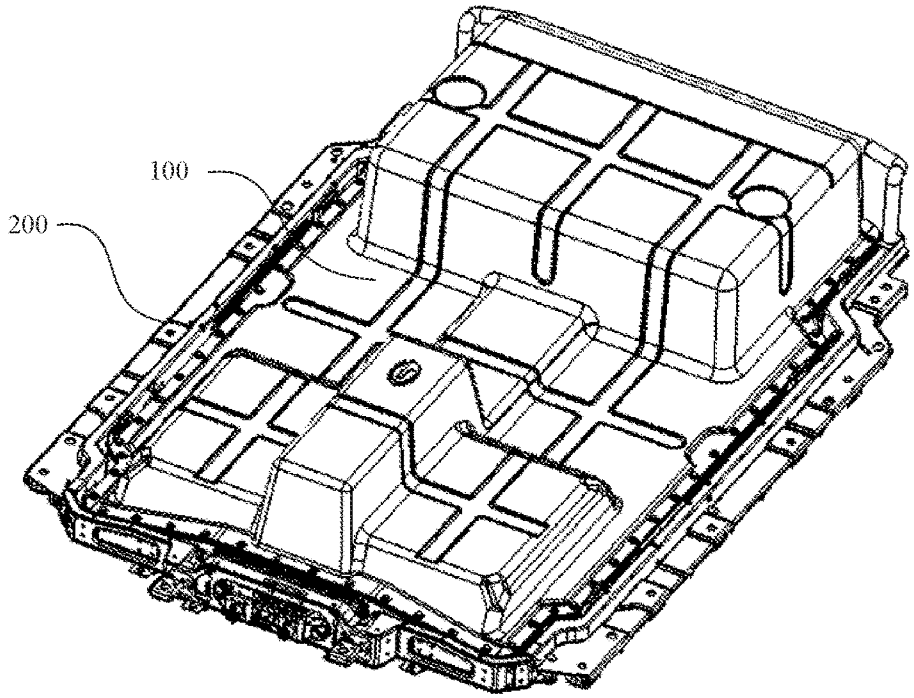
FIG. 1 is an assembly structural schematic diagram of a quick-change battery box and a quick-change support according to an embodiment of the present invention.

Quick-change battery box 100; limiting member 101; positioning surface 103; guide surface 104; connecting surface 105; bottom wall portion 106; side wall portion 107; slide channel 108; lock shaft 111; quick-change support 200; elastic member 201; mounting portion 203; mounting hole 204; protruded portion 211; upper inclined surface 212; lower inclined surface 213; left inclined surface 214; right inclined surface 215; free end 218; snap-fit portion 219; lock base 230; lock groove 231; rising section 233; locking section 234; locking position 236; curved surface 238; lower curved surface 241; upper curved surface 242; curved guide surface 243; gap 245.

DETAILED DESCRIPTION OF THE PREFERRED EMBODIMENT

The present invention will be further described by means of embodiments below in conjunction with drawings, but the present invention is not therefore limited to the scope of the embodiments.

The present embodiment provides an electric automobile, the electric automobile realizes an endurance by means of detaching the old battery that has finished the use (depleted or consumed to a certain extent) on it, and mounting a new battery fully charged or partially charging finished (has been charged enough to an extent of being able to use) to the electric automobile.

Figure 2:
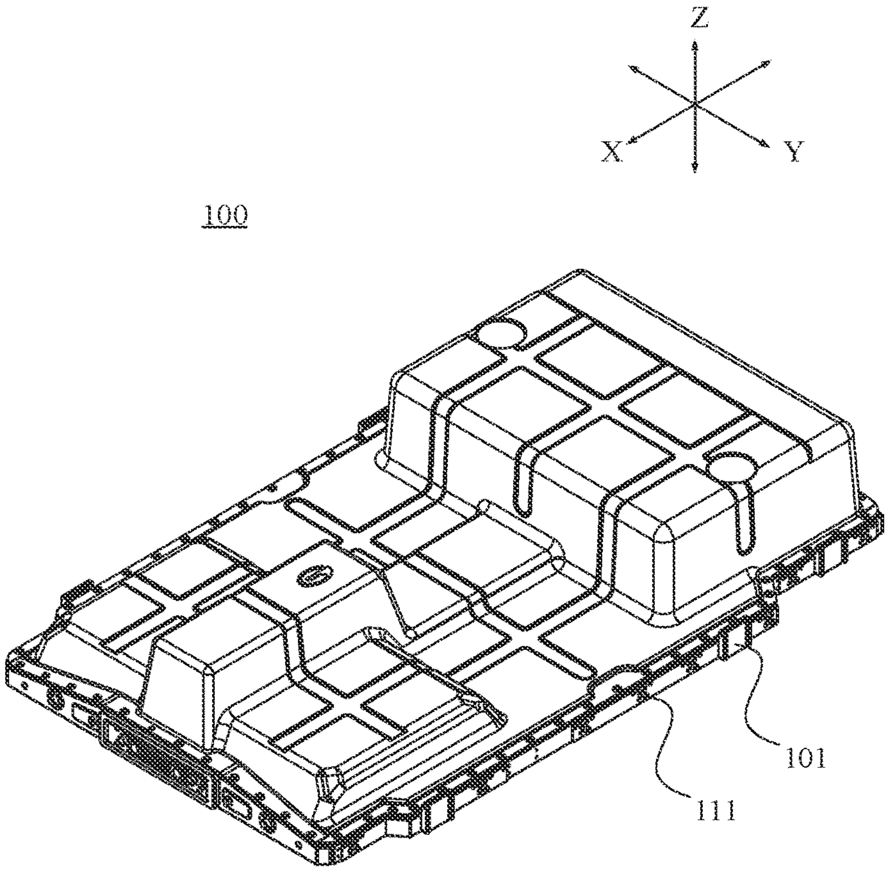
FIG. 2 is a perspective structural schematic diagram of a quick-change battery box according to an embodiment of the present invention.
Figure 3:
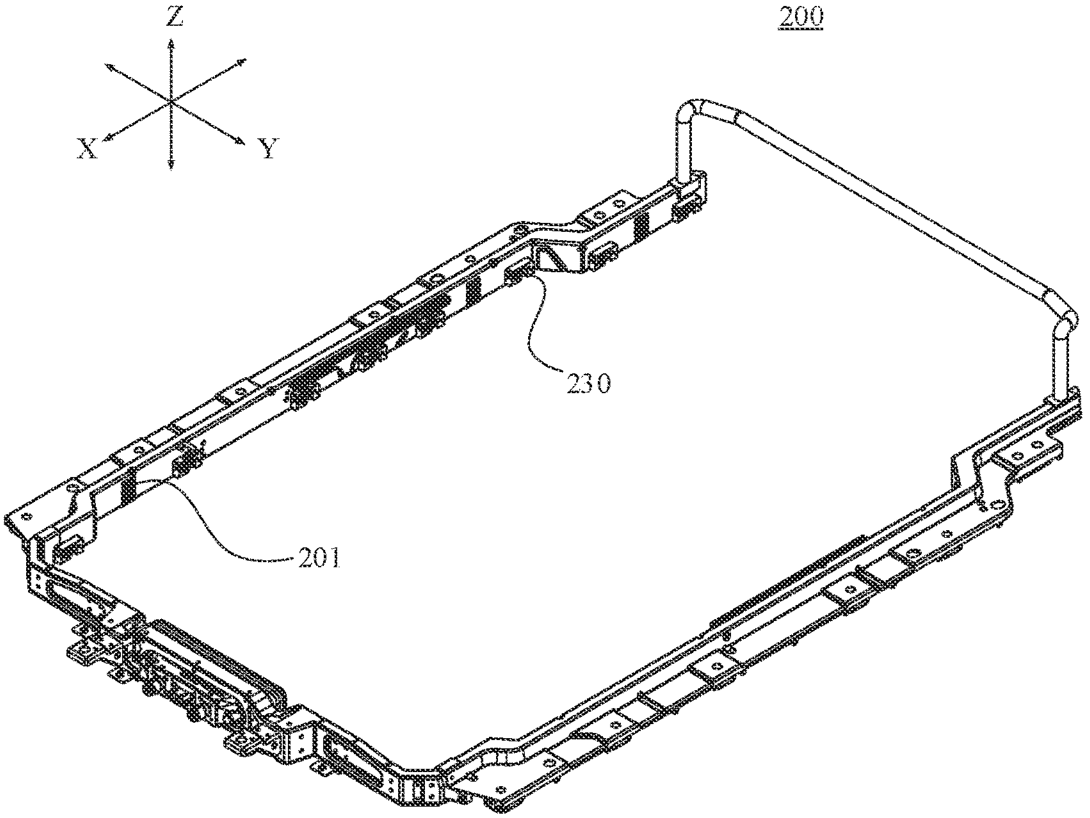
FIG. 3 is a perspective structural schematic diagram of a quick-change support according to an embodiment of the present invention.
Figure 4:
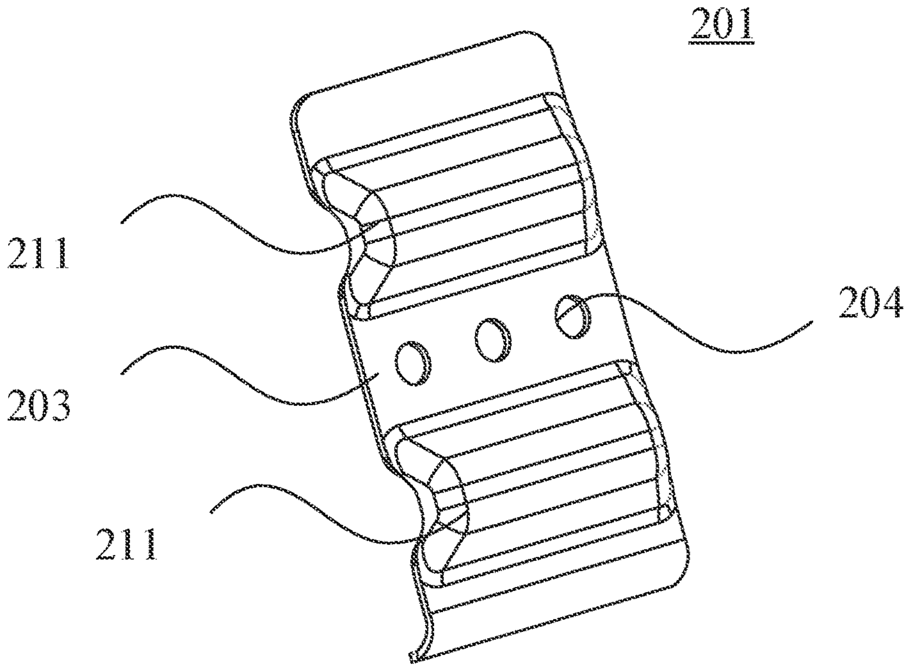
FIG. 4 is a perspective structural schematic diagram of a quick-change battery box according to an embodiment of the present invention when viewing from the front.
Figure 5:
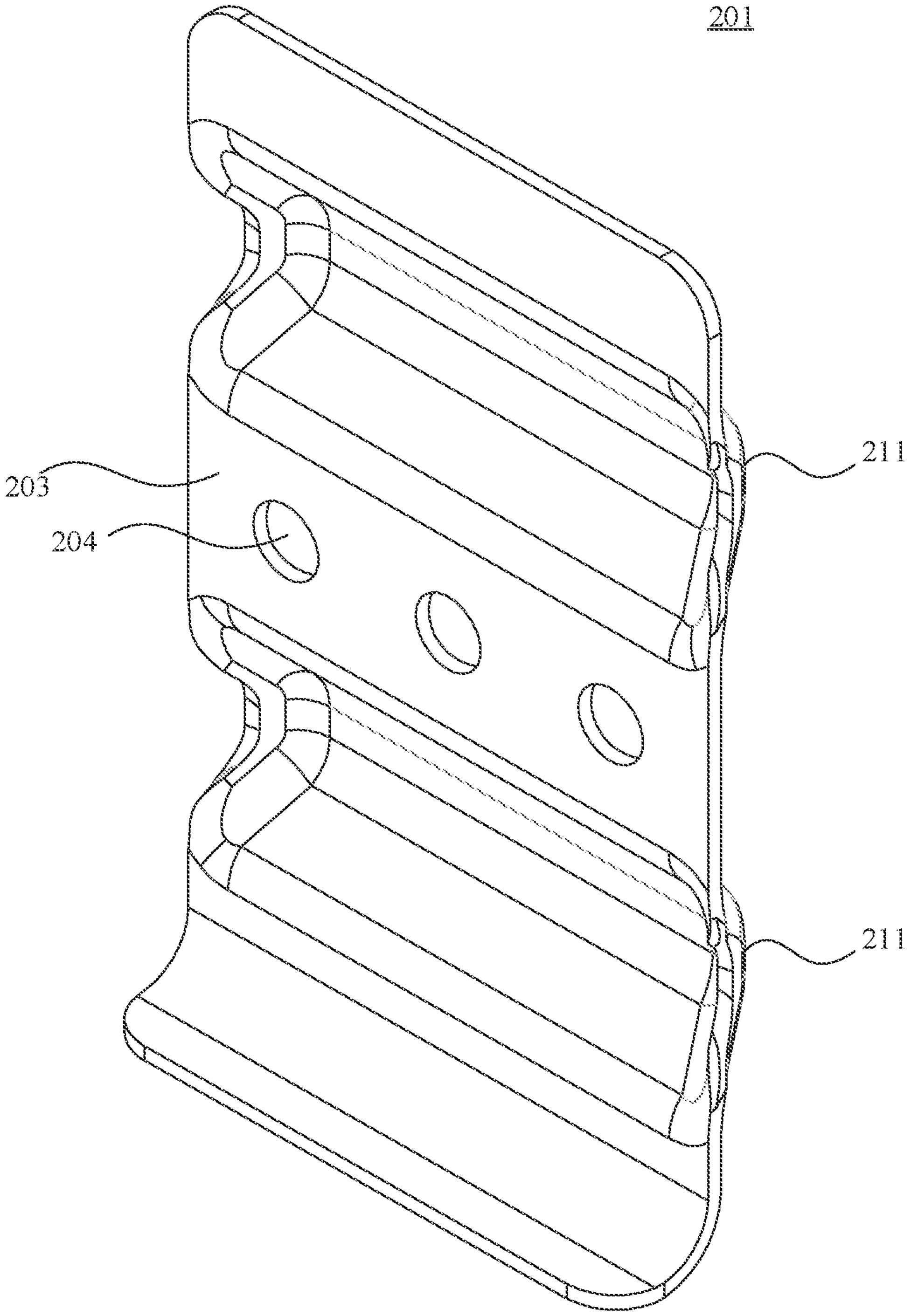
FIG. 5 is a perspective structural schematic diagram of an elastic member according to an embodiment of the present invention when viewing from the rear.

The electric automobile includes a quick-change battery box 100 shown in FIG. 2 and a quick-change support 200 shown in FIG. 3. As shown in FIG. 1, the quick-change battery box 100 is mounted to the quick-change support 200. By mounting and detaching the quick-change battery box 100 relative to the quick-change support 200, a replacement of the old and new batteries as above is realized.

FIGS. 2 and 3 illustrate an implemented state of the quick-change battery box 100 and the quick-change support 200 according to the present embodiment, but it does not mean that the present invention can only be applied to the quick-change battery box 100 and the quick-change support 200 of the shape or structure shown in FIGS. 2 and 3. In other embodiments, the quick-change battery box 100 and the quick-change support 200 can also have other shapes or structures without departing from the main principle of the present invention.

The quick-change battery box 100 in the present application refers to a replaceable battery formed in a way of battery pack, not necessarily refers it to a box-type structure.

The quick-change battery box 100 and the quick-change support 200 are limited and guided in X, Y, and Z directions by a limiting guide device.

The limiting guide device comprises an elastic member 201 and a limiting member 101.

As shown in FIGS. 2 and 3, in this embodiment, the limiting member 101 is arranged to the outer side wall of the quick-change battery box 100, and the elastic member 201 is arranged to the inner side wall of the quick-change support 200.

In other embodiments, it can also be arranged as: the limiting member 101 is arranged to the inner side wall of the quick-change support 200, while the elastic member 201 is arranged to the outer side wall of the quick-change battery box 100.

As shown in FIGS. 4-8, the elastic member 201 is used to elastically limit the movement of the quick-change battery box 100 in the quick-change support 200, thereby preventing the quick-change battery box 100 being damaged.

The elastic member 201 comprises a mounting portion 203 and a protruded portion 211, the mounting portion 203 is used to mount the elastic member 201 on the inner side wall of the quick-change support 200, the protruded portion 211 is extended and protruded relative to the mounting portion 203 in a direction that is facing away from the inner side wall of the quick-change support 200. A groove is formed on the surface of the protruded portion 211 facing the quick-change support 200, when the elastic member 201 is mounted to the quick-change support 200, there is a gap defined by the groove between the protruded portion 211 and the inner side surface of the quick-change support 200. When the battery box is mounted into the quick-change support, the protruded portion deforms toward the inner side wall of the quick-change support.

The protruded portion 211 has an upper inclined surface 212 and a lower inclined surface 213 that are oppositely arranged, the upper inclined surface 212 and the lower inclined surface 213 are inclinedly arranged from the protruded end of the protruded portion 211 toward the mounting portion 203.

The protruded portion 211 further has a left inclined surface 214 and a right inclined surface 215 that are oppositely arranged, the left inclined surface 214 and the right inclined surface 215 are inclinedly arranged in a direction from the protruded end of the protruded portion 211 toward the mounting portion 203.

These inclined surfaces make the protruded portion 211 have a better elasticity and a better guidance. The directions of these inclined surfaces only refer to their relative directions, not that they must be placed on the left and right orientations or up and down orientations of a viewer. By arranging upper and lower inclined surfaces and left and right inclined surfaces on the protruded portion 211, during a process of mounting the battery box to the quick-change support, the contact and guidance between the elastic member and the limiting member are facilitated, and the friction during a relative moving process between the two is reduced, improving an efficiency of mounting and detaching the battery box.

In the present embodiment, the elastic member 201 comprises two of the protruded portions 211 distributed along the vertical direction (Z direction). The mounting portion 203 is disposed between two of the adjacent protruded portions 211.

By arranging a plurality of protruded portions 211, the elasticity thereof can be better ensured.

However, the present invention is not limited thereto. The number of protruded portion 211 can be arranged according to actual needs, may arranged to be one, may also be arranged to be more than three, the number of protruded portion 211 does not influence the realization of its functions.

In the present embodiment, an upper end of the elastic member 201 is a free end 218, and the free end 218 is connected to one side of the upper inclined surface of the protruded portion. The free end 218 may be a plate-shaped structure that is attached to the inner side surface of the quick-change support, or the free end 218 may be a plate-shaped structure that has a certain gap with the quick-change support. A lower end of the elastic member 201 is disposed with a snap-fit portion 219, and the snap-fit portion is used for snap-fitting with the inner side wall of the quick-change support 200.

Figure 6:
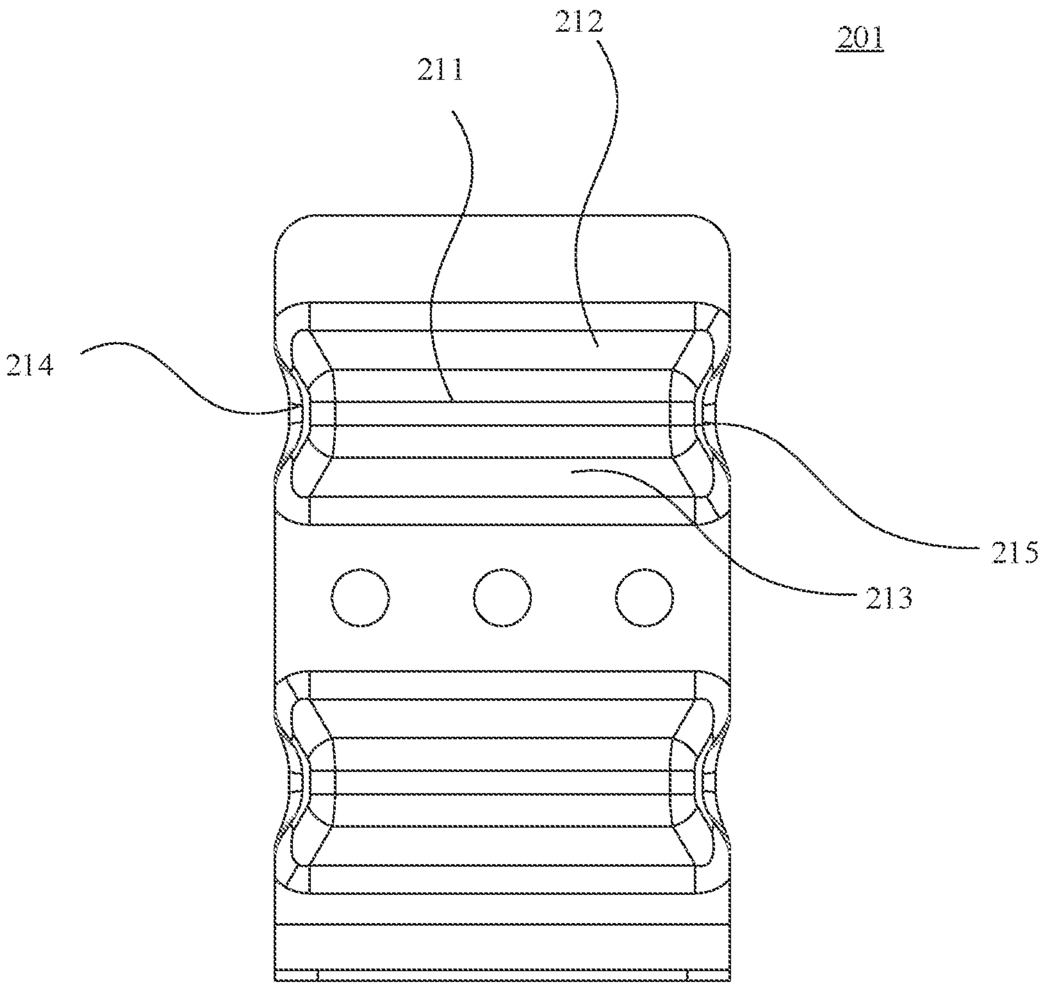
FIG. 6 is a front view structural schematic diagram of an elastic member according to an embodiment of the present invention.
Figure 7:
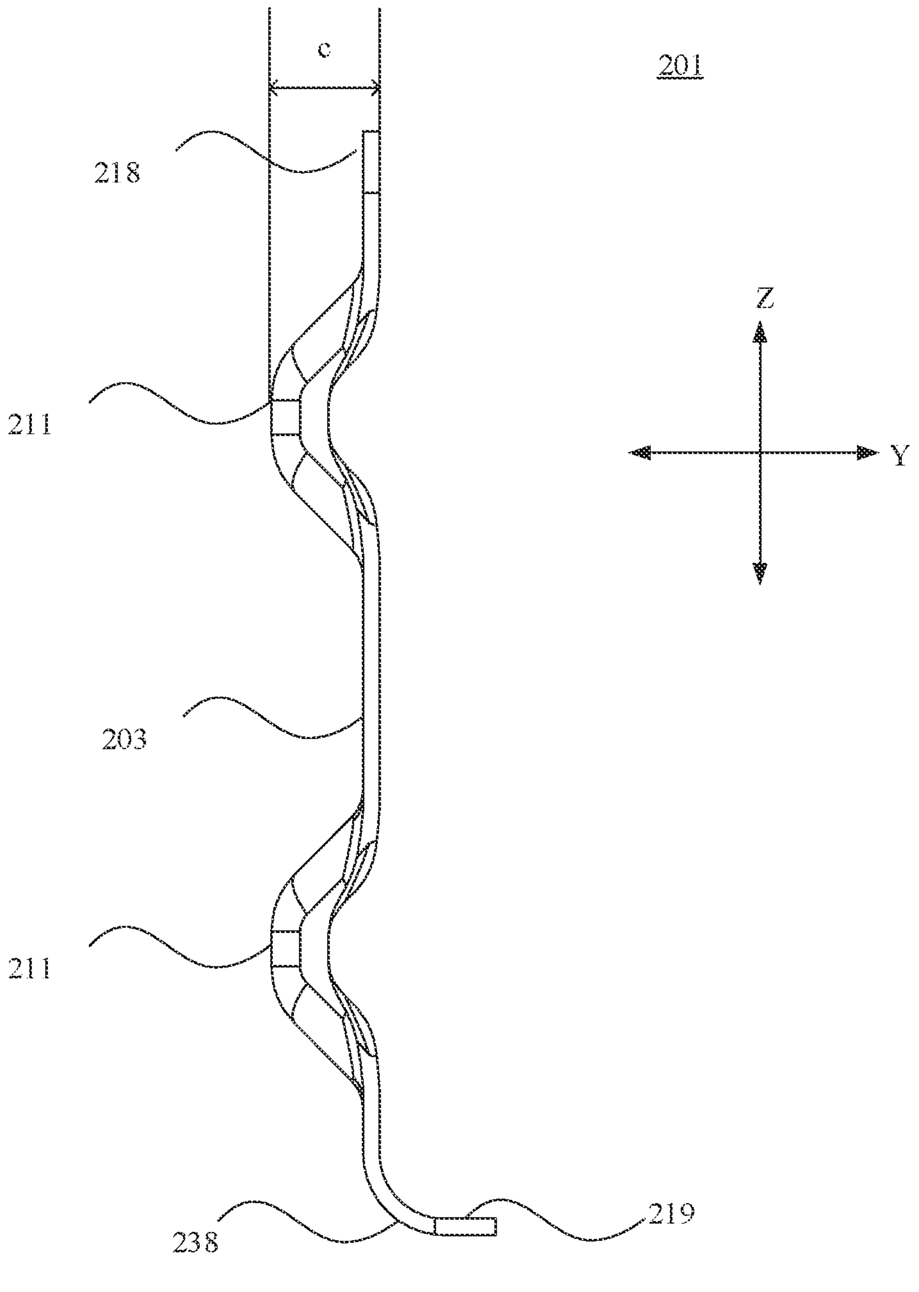
FIG. 7 is a rear view structural schematic diagram of an elastic member according to an embodiment of the present invention.

As shown in FIG. 6, the snap-fit portion 219 is formed as bending towards the inner side wall of the quick-change support 200 of the electric automobile. Optionally, the snap-fit portion 219 can be formed into a hook shape, which hooks the lower surface of the inner side wall of the quick-change support 200, thereby facilitating the positioning and mounting of the elastic member 201 relative to the quick-change support 200, also further limiting the movement of the elastic member 201 relative to the quick-change support 200. A position of connection between the snap-fit portion 219 and the protruded portion 211 is a curved surface 238, when the limiting member 101 is snapped into from the bottom orientation of the elastic member 201, the curved surface 238 facilitates the snapping of the limiting member 101, preventing an interference of the bottom structure of the elastic member 201 to the upward movement of the limiting member 101.

In other embodiments, the snap-fit portion 219 may also form as other shapes capable of snap-fitting with the inner side wall of the quick-change support 200. Optionally, a corresponding groove or the like may be arranged to the inner side wall of the quick-change support 200 to snap-fit with the snap-fit portion 219.

In another embodiment, the snap-fit portion 219 may be arranged to an upper end of the elastic member 201, while a lower end of the elastic member 201 is the free end 218.

In yet another embodiment, and upper and lower ends of the elastic member 201 can both be arranged with snip-fit portions 219.

Optionally, the snap-fit portion 219 may not be arranged, so that upper and lower ends of the elastic member 201 are both free ends 218.

The mounting portion 203 is arranged with a mounting hole 204, the elastic member 201 is fixed to the inner side wall of the quick-change support 200 through a threaded member. Optionally, other ways can also be used to fix the mounting portion 203 and the quick-change support 200.

As shown in FIGS. 8-11, the limiting member 101 is used to cooperate with the elastic member 201 as the above.

The limiting member 101 comprises a positioning surface 103 and a guide surface 104, the positioning surface 103 is used to abut against the elastic member 201, and the guiding surface 104 extends and protrudes outward from the positioning surface 103.

In the present embodiment, the limiting member 101 comprise two of the guide surfaces 104, two of the guide surfaces 104 are respectively oppositely disposed to the two sides of the positioning surface 103, and extend along the vertical direction, and a sliding passage 108 is formed between the guide surface 104 and the positioning surface 103 for the elastic member 201 to slide into.

Optionally, the limiting member 101 may also comprise more than three guide surfaces 104 to facilitate the guiding to the elastic member 201.

A connecting surface 105 is disposed between the guide surface 104 and the positioning surface 103, the connecting surface 105 is a curved-shaped surface, for facilitating the manufacture and making the guide surface 104 extend smoothly to the positioning surface 103.

The limiting member 101 comprises a bottom wall portion 106 and side wall portions 107 disposed at two sides of the bottom wall portion 106, and the guide surfaces 104 are two opposite surfaces of the side wall portion 107. The two side wall portions 107 and the bottom wall portion 106 surround into a sliding passage 108 extending in the Z direction.

Figure 8:
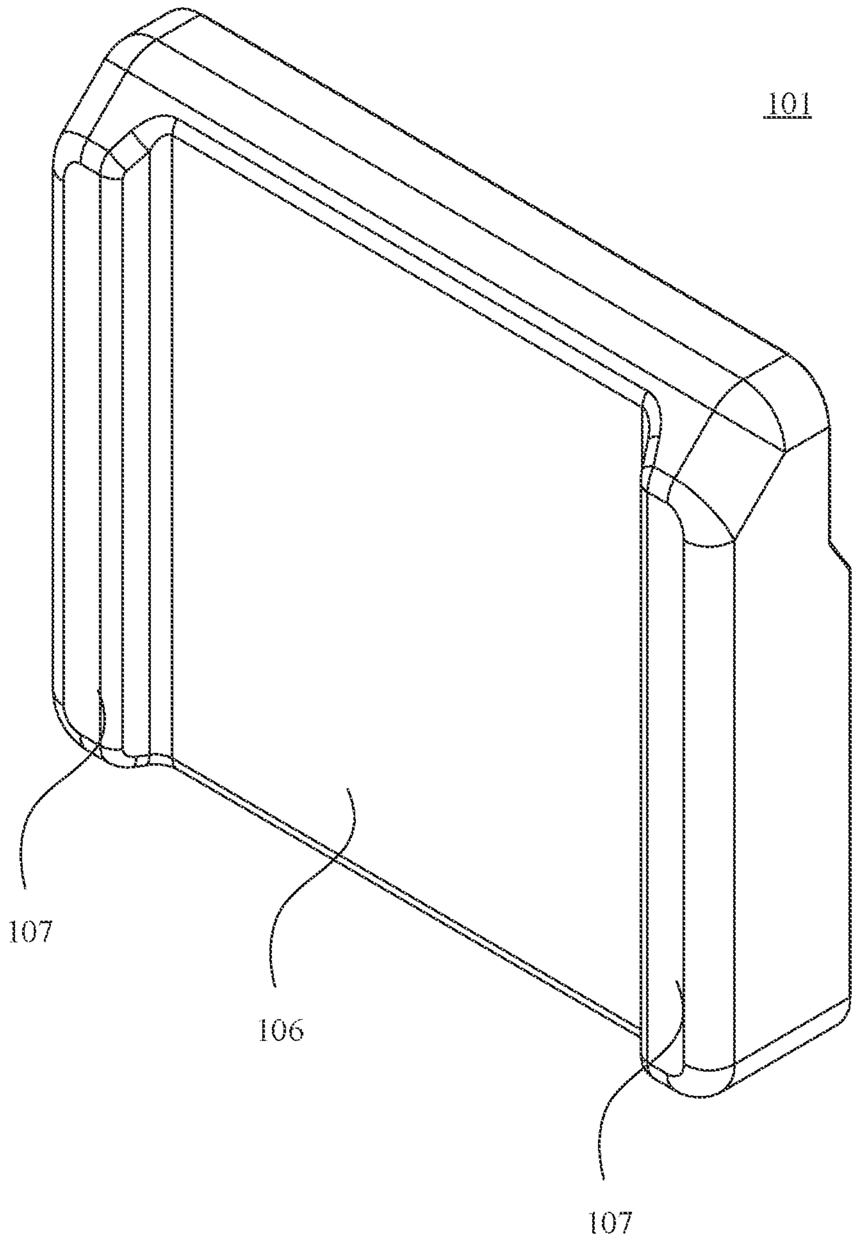
FIG. 8 is a side view structural schematic diagram of an elastic member according to an embodiment of the present invention.

The bottom and top of the side wall portion 107 along the vertical direction are disposed with a lower curved surface 241 and an upper curved surface 242 (as shown in FIG. 8), being used to guide the limiting member 101 for abutting against and limiting the elastic member 201 on the quick-change support 200, facilitating the entering of the limiting member 101 into the gap between the battery box 100 and the quick-change support 200.

The bottom and the top of the bottom wall portion 106 are arranged with curved guide surfaces 243, facilitating a mutual contact with the elastic member 201 and guiding it to abut against the positioning surface 103.

The lower curved surface 241 not only forms a curve extending along the Y direction in FIG. 8, but also forms a curve extending along the X direction. The upper curved surface 242 is also like this. By arranging each edge or angle of the limiting member 101, that is, the side wall portion 107 and the bottom wall portion 106 to be a curved surface structure, on one aspect, facilitating the contact and guidance between the limiting member 101 and the elastic member 201, reducing the wear between the two, on the other hand, facilitating the entering of the limit member 101 into a narrow space between the battery box 100 and the quick-change support 200, preventing the limit member 101 from being unable to enter the gap between the quick-change support 200 and the battery box 100 due to a small positioning deviation of the battery box 100 and the quick-change support 200, thereby resulting in a low mounting efficiency of the battery box 100.

Figure 9:
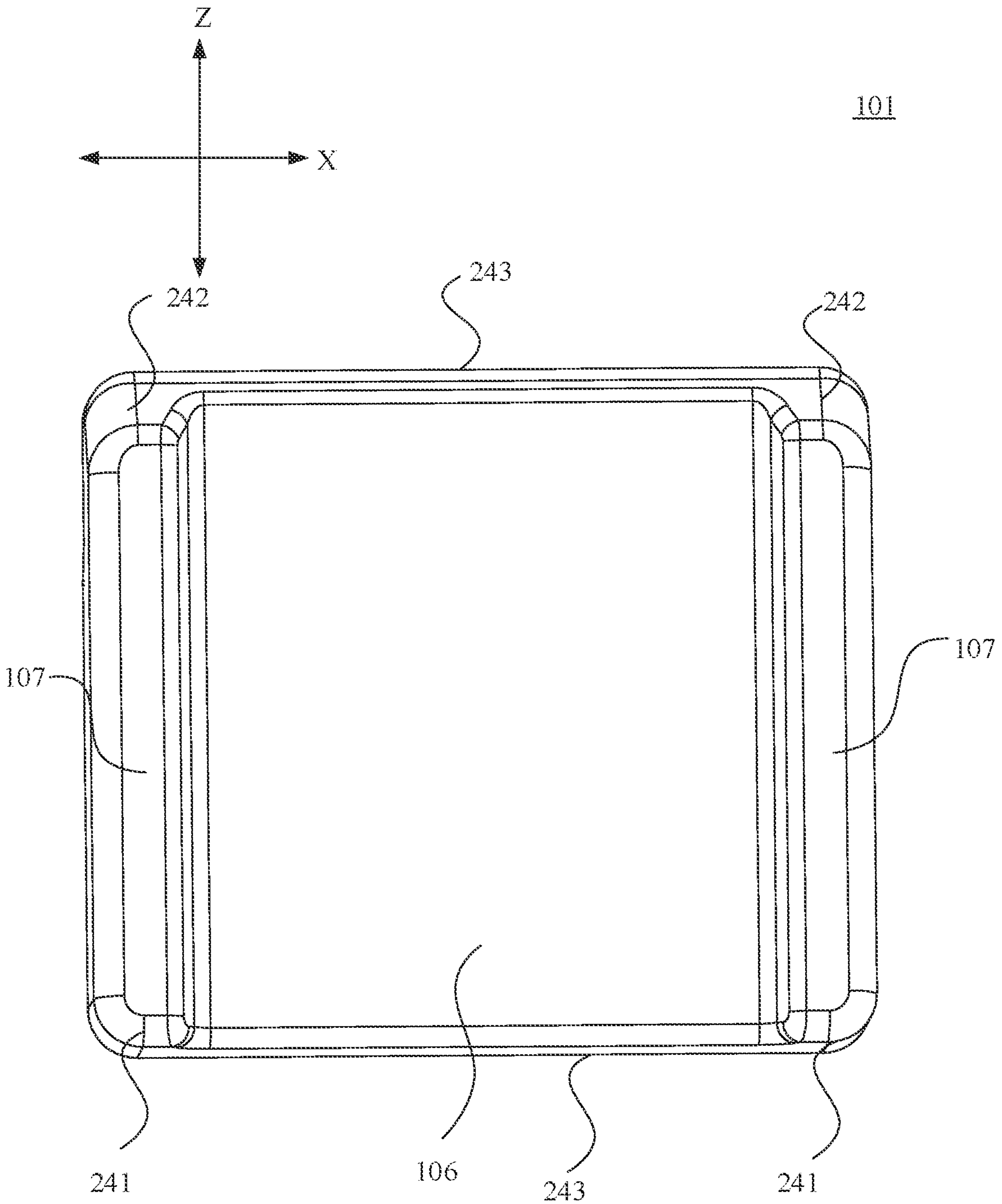
FIG. 9 is a perspective structural schematic diagram of a limiting member according to an embodiment of the present invention.
Figure 10:
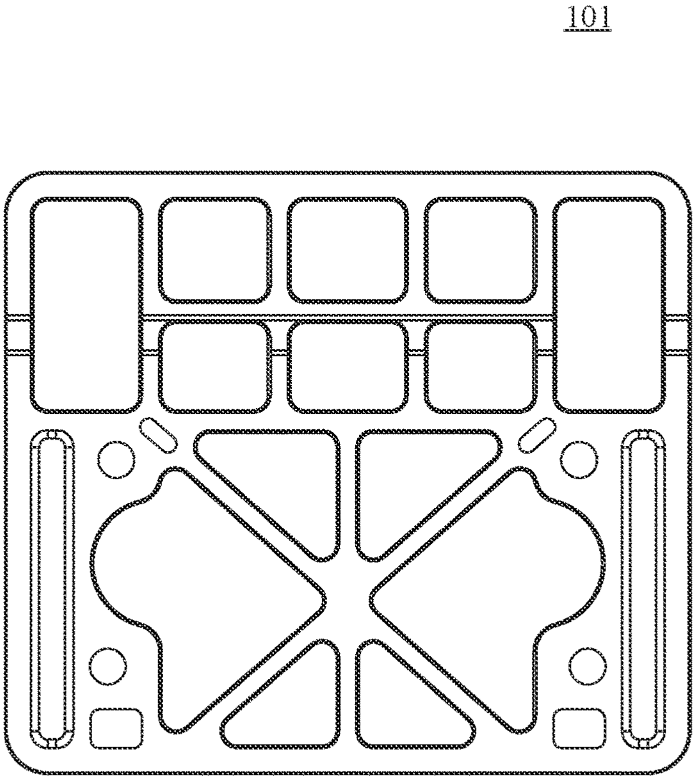
FIG. 10 is a front view structural schematic diagram of a limiting member according to an embodiment of the present invention.

As shown in FIG. 9, one side of the side wall portion 107 facing the bottom wall portion 106, and the other side of the bottom wall portion 106 is hollowed out for reducing the weight of the limiting member 101. A gap 245 is formed between a side of the bottom wall portion facing the outer side wall of the battery box and the outer side wall (see FIG. 13).

Figure 11:
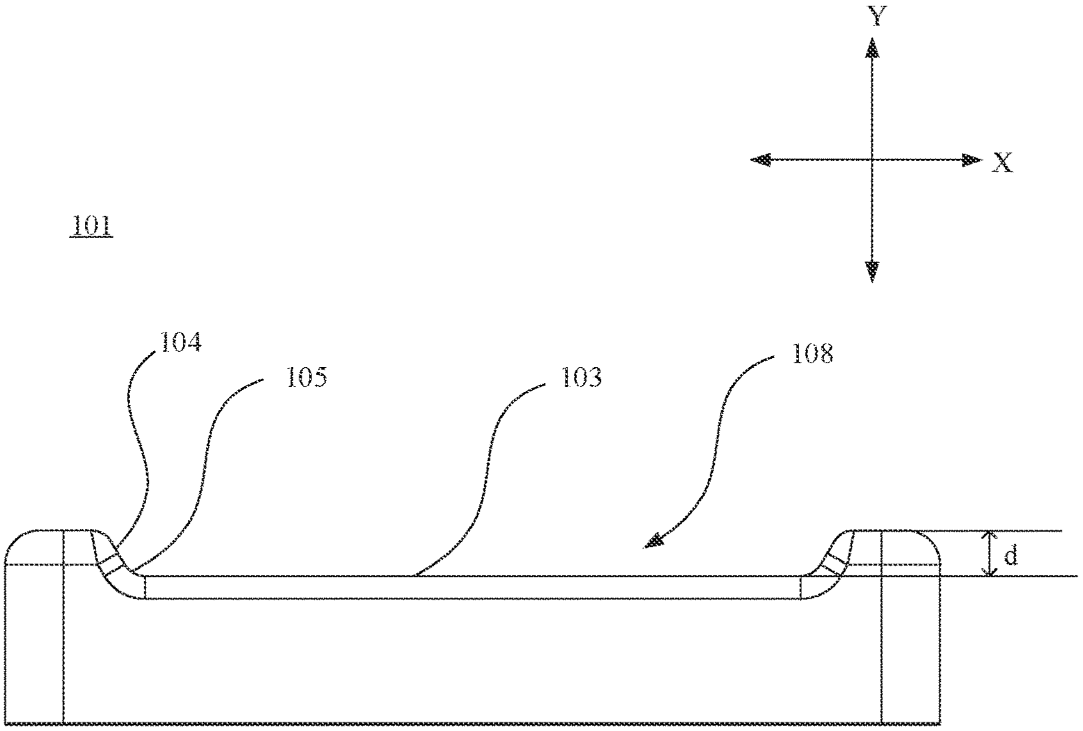
FIG. 11 is a rear view structural schematic diagram of a limiting member according to an embodiment of the present invention.
Figure 12:
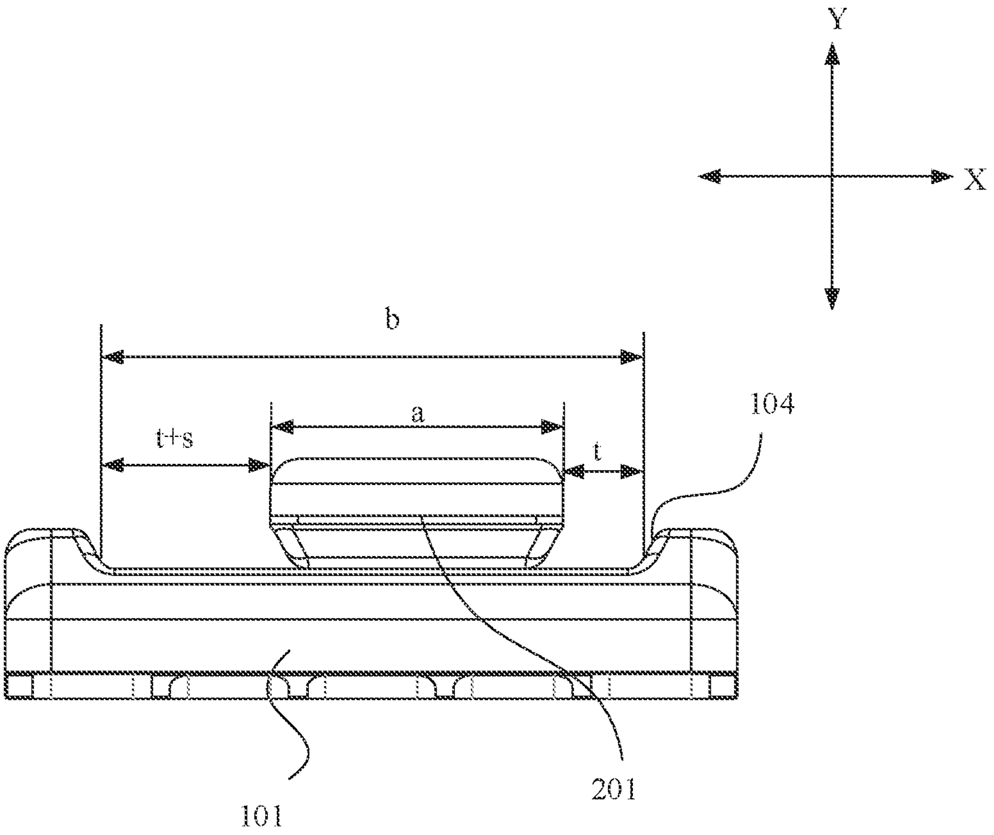
FIG. 12 is a top view structural schematic diagram of a limiting member according to an embodiment of the present invention.
Figure 13:
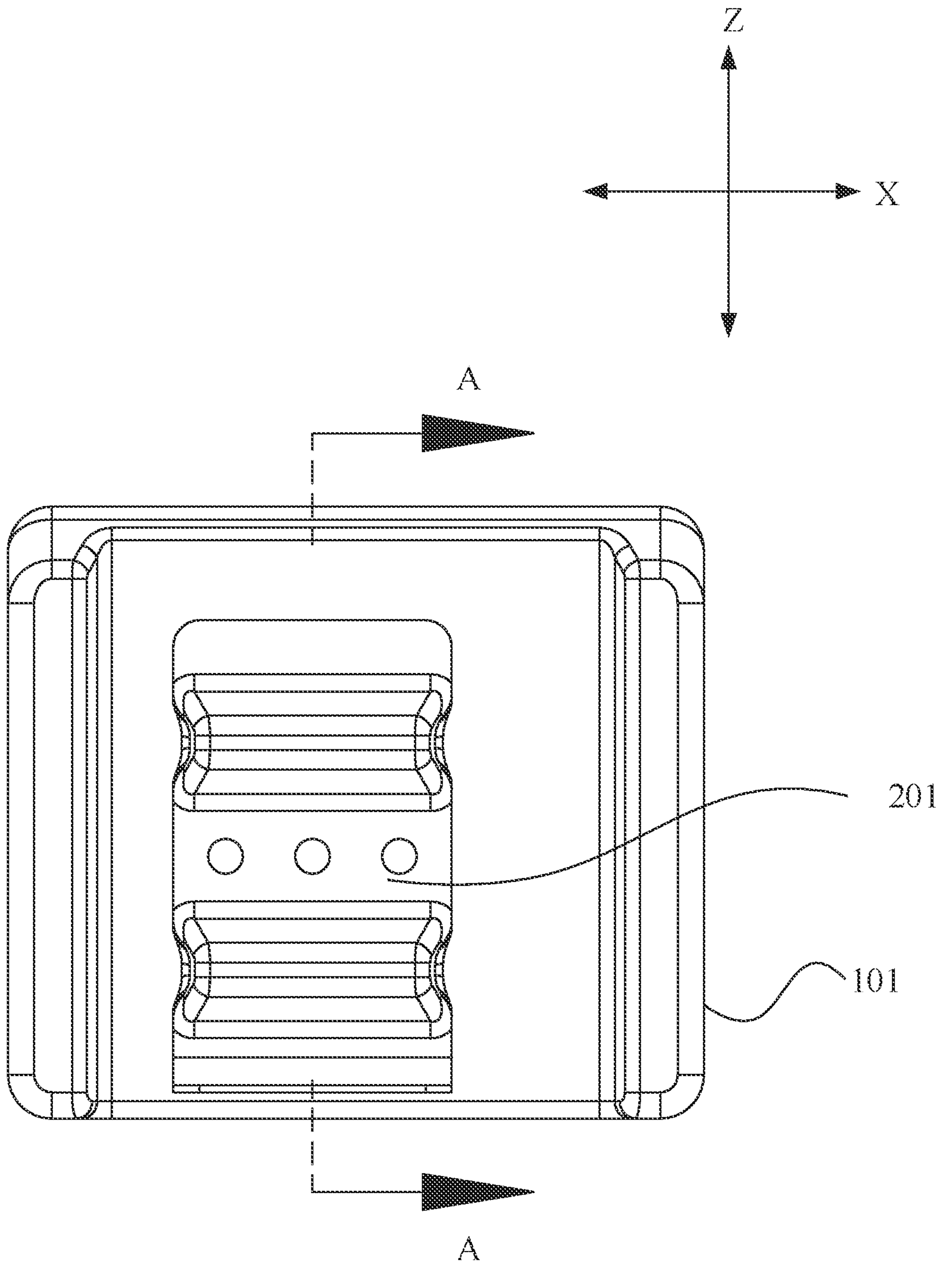
FIG. 13 is a top view structural schematic diagram of an elastic member and a limiting member that are under an abutting status according to an embodiment of the present invention.

As shown in FIGS. 11-13, when the quick-change battery box 100 is loaded into the quick-change support 200, the elastic member 201 is extruded by the limiting member 101 to deform.

During a moving process of the limiting member 101 in the vertical direction (Z direction), the upper and lower inclined surfaces of the protruded portion 211 of the elastic member 201 are used to guide the limiting member 101 and the protruded portion 211 of the elastic member 201 to extrude and limit, reducing the friction and wear to the protruded portion 211 during an up and down moving process of the limiting member 101, making the limiting member 101 move up and down smoothly, and the snap-fit portion of the elastic member 201 is bent toward the direction of the quick-change support, facilitating the upward movement of the limiting member 101 to extruded and limit the elastic member 201, preventing an interference to the upward movement of the protruded portion 211.

The left and right inclined surfaces of the elastic member 201 cooperate with the side wall portion 107 of the limiting member 101 to facilitate the elastic member to enter into the limiting member.

The pre-compressed dimension of the elastic member 201 is e (not shown in the figure), the thickness of the elastic member 201 (original thickness before deformation) is c (see FIG. 7), the groove depth of the limiting member 101 is d (see FIG. 11), wherein, c=d+e.

The pre-compressed dimension e is the compressed dimension of the elastic member 201 when the quick-change battery box 100 is loaded into the quick-change support 200.

A value range of e is 0.4-1 mm. When e is within the range, the elastic member 201 can effectively improve the driving effect of the vehicle without influencing the efficiency of replacing the battery, preventing the shaking of the battery box relative to the quick-change support in the Y direction.

When the quick-change battery box 100 is loaded into the quick-change support 200, the gap between the outer side wall of the quick-change battery box 100 and the inner side wall of the quick-change support 200 is K, the thickness of the limiting member 101 is F, K−F is greater than 0 and less than 2, preferably, K−F is equal to 1. K−F within the range facilitates a cost control as well as providing reliability and durability of the mounting. When K−F is less than 1, the precision control requirements of each mating surface of the limiting member 101 and the elastic member 201 are relatively high, the cost is relatively high, if K−F is greater than 1, the battery pack is easy to shake when the vehicle is driving, having adverse influences to the reliability of the mounting and the durability of the battery pack.

As shown in FIG. 11, when at an initial status, that is, when the elastic member 201 is inserted into the limiting member 101 but no movement is generated at the X direction, a distance between the out most border of the side edge of the elastic member 201 and the guide surface 104 nearliest in distance from it is a reserved gap t, a width of the elastic member 201 is a, a horizontal battery swapping stroke of the quick-change battery box 100 is s, and a distance between the guide surfaces 104 is b, b=a+2t+s.

When the quick-change battery box 100 is mounted to the quick-change support 200 and is horizontally moved to a locked position, by means of the arrangement of b=a+2t+s, a collision or an interference from occurring between the elastic member 201 and the side wall portion 107 of the limiting member 101 can be prevented.

As shown in FIG. 12, a battery box is disposed with a lock shaft 111 (see FIG. 2), a quick-change support 200 is disposed with a lock base 230 (see FIG. 3), and inside of the lock base 230 is disposed with a lock groove 231 for engaging with the lock shaft 111.

Figure 15:
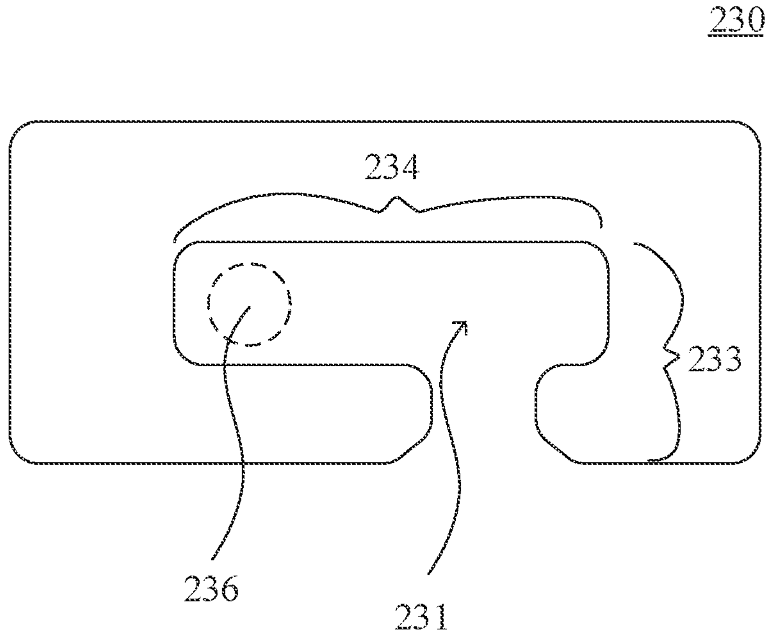
FIG. 15 is a structural schematic diagram of a lock groove according to an embodiment of the present invention.

As shown in FIG. 15, the lock groove 231 comprises a rising section 233 and a locking section 234, and the locking section 234 extends horizontally from the rising section 233 toward a locking direction.

Figure 14:
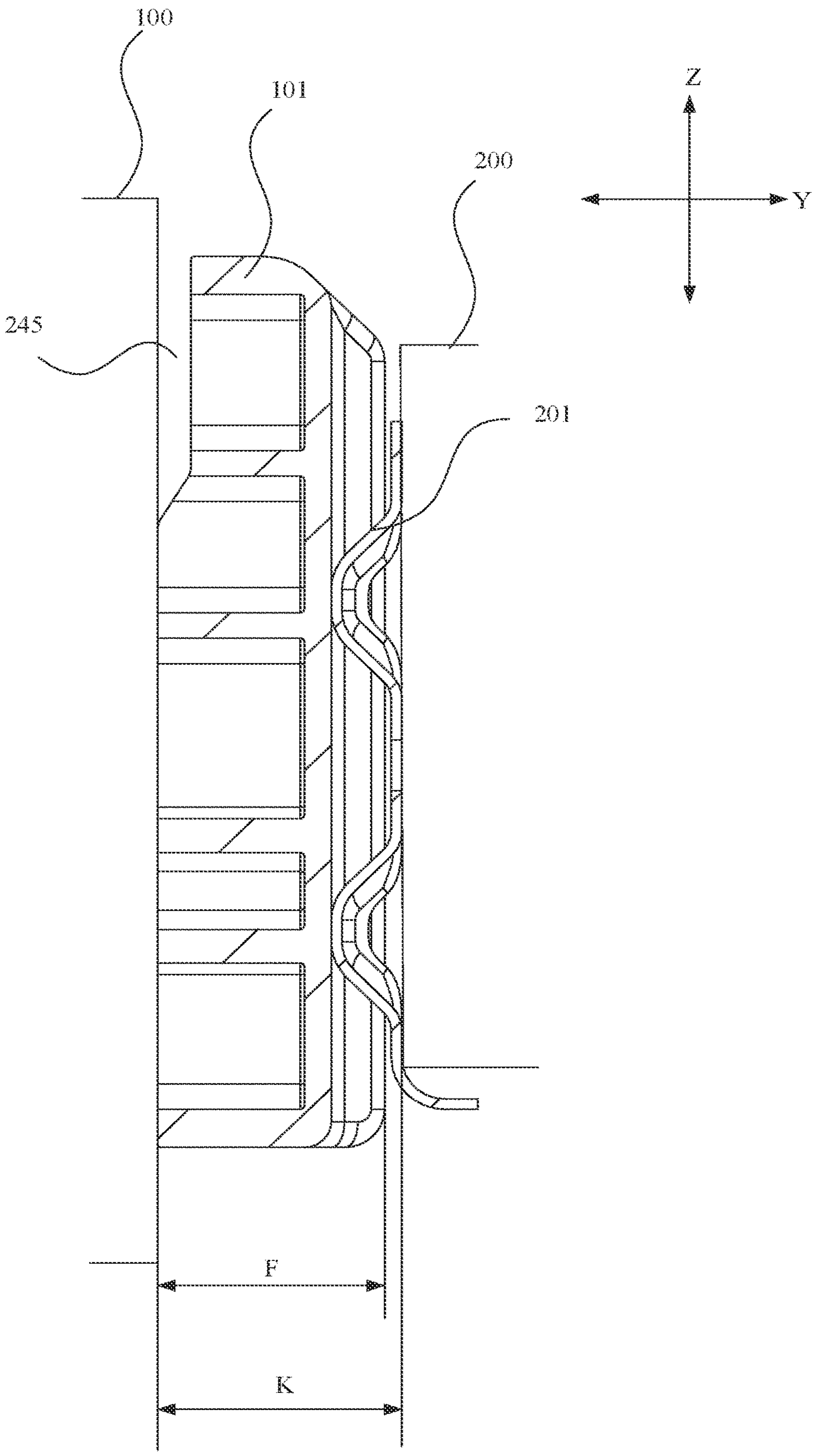
FIG. 14 is a cross-sectional structural schematic diagram of an elastic member and a limiting member that are under an abutting status according to an embodiment of the present invention.

The lock shaft 111 is fixed to the quick-change battery box 100, with the vertical movement of the quick-change battery box 100, the lock shaft 111 vertically upward enters the rising section 233 of the lock groove 231 from an opening at the bottom orientation of the lock groove 231, and vertically rises along the rising section 233, after the lock shaft 111 rises to a position aligning with the locking section 234, the lock shaft 111 moves horizontally along the locking section 234 toward the locked position of the locking section 234 with the horizontal movement of the quick-change battery box 100, until the lock shaft 111 moves to the locked position, the lock shaft 111 is locked in the locked position of the lock groove 231, thereby the quick-change battery box 100 is locked to the quick-change support 200. A distance of horizontal movement for the lock shaft 111 moving from the rising section 233 to the locked position is a horizontal battery swapping stroke. In FIG. 14, the locked position 236 is indicated by a dotted circle, and in the locked status, the lock shaft 111 is at the position of the dotted circle.

When the lock shaft 111 is positioned at the rising section 233, the distance c between the elastic member 201 and the guide surface 104 of the limiting member 101 facing to the locking direction is greater than the distance s for the lock shaft to move from the rising section 233 to the locked position in the locked section 234, thereby preventing a collision or an interference between the elastic member 201 and the side wall portion 107 of the limiting member 101 due to the locked action of the quick-change battery box 100.

In the following, according to FIGS. 16-19, changing situations of the cooperating relationship between the elastic member 201 and the limiting member 101 with the cooperating relationship between the lock shaft 111 and the lock seat 230 are illustrated.

FIGS. 16-19 sequentially illustrate four representative statuses of a duration from when a battery pack 100 is loaded into the quick-change support 200 until it is locked.

Figure 16:
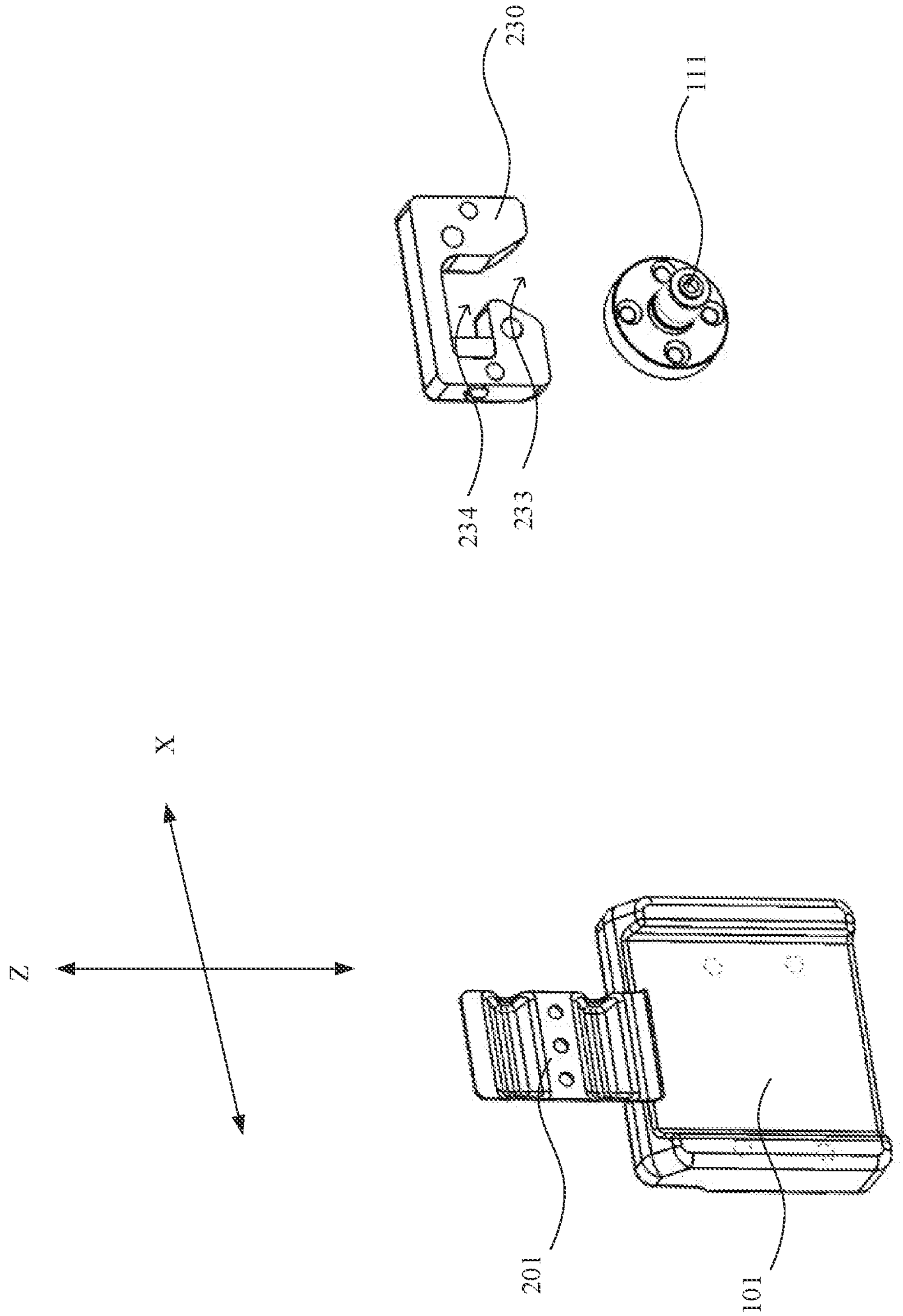
FIG. 16 is a first schematic diagram illustrating a relative changing status of a cooperating relationship between an elastic member and a limiting member and a cooperating relationship between a lock base and a lock shaft according to an embodiment of the present invention.

As shown in FIG. 16, when the battery pack 100 is loaded into the quick-change support 200 from bottom to top, the elastic member 201 on the quick-change support 200 is about to be inserted into the limiting member 101 on the battery pack 100, while the lock shaft 111 has not yet been inserted into the lock groove 231 of the lock base 230. At this moment, a horizontal relative position of the limiting member 101 and the elastic member 201, that is, a relative position in the X direction satisfies the relationship formula $b=a+2t+s$.

Figure 17:
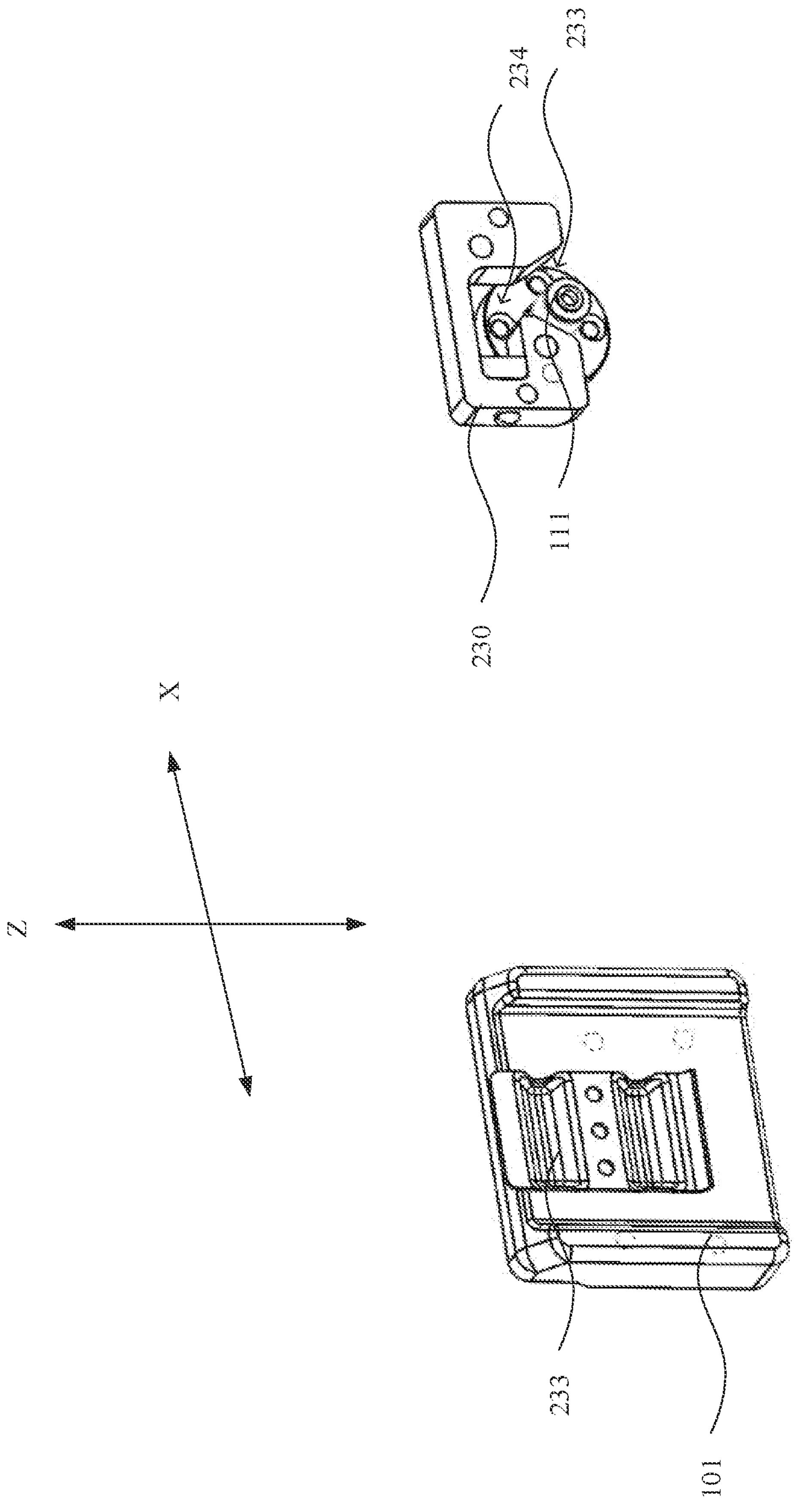
FIG. 17 is a second schematic diagram illustrating a relative changing status of a cooperating relationship between an elastic member and a limiting member and a cooperating relationship between a lock base and a lock shaft according to an embodiment of the present invention.

As shown in FIG. 17, when the battery pack 100 continues to move up relative to it of FIG. 16, the elastic member 201 on the quick-change support 200 is inserted into the limiting member 101 on the battery pack 100, while the lock shaft 111 is inserted into the rising section 233 of the lock groove 231 of the lock base 230. At this moment, a horizontal relative position of the limiting member 101 and the elastic member 201, that is, a relative position in the X direction still satisfies the relationship formula $b=a+2t+s$.

But in the Y direction, the elastic member 201 is extruded, and it is in the extruded status as shown in FIG. 14, the deformation amount of the elastic member 201 satisfies a formula: $c=d+e$. The gap between the limiting member 101 and the inner side wall of the quick-change support 200 satisfies the relationship formula $K-F$ is greater than 0 and less than 2, preferably, $K-F$ is equal to 1.

Figure 18:
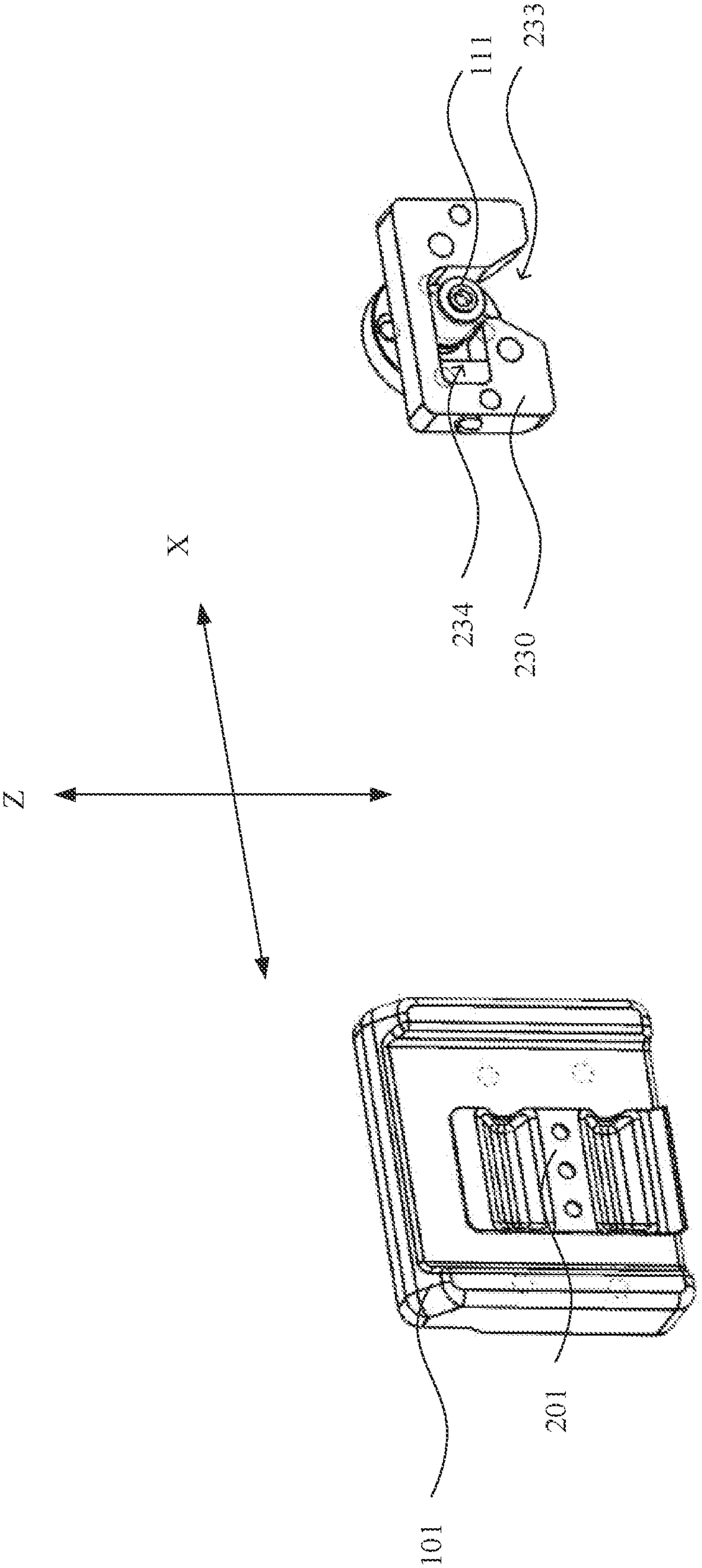
FIG. 18 is a third schematic diagram illustrating a relative changing status of a cooperating relationship between an elastic member and a limiting member and a cooperating relationship between a lock base and a lock shaft according to an embodiment of the present invention.

As shown in FIG. 18, at this moment, the battery pack 100 has moved to the highest point in the vertical direction (Z direction) relative to it of FIG. 17, the lock shaft 111 arrives to the highest position of the rising section 233 of the lock groove 231, and the lock shaft 111 stops moving in the vertical direction.

A horizontal relative position of the limiting member 101 and the elastic member 201, that is, a relative position in the X direction still satisfies the relationship formula $b=a+2t+s$. The deformation amount of the elastic member 201 satisfies the formula: $c=d+e$. The gap between the limiting member 101 and the inner side wall of the quick-change support 200 satisfies the relationship formula $K-F$ is greater than 0 and less than 2, preferably, $K-F$ is equal to 1.

Figure 19:
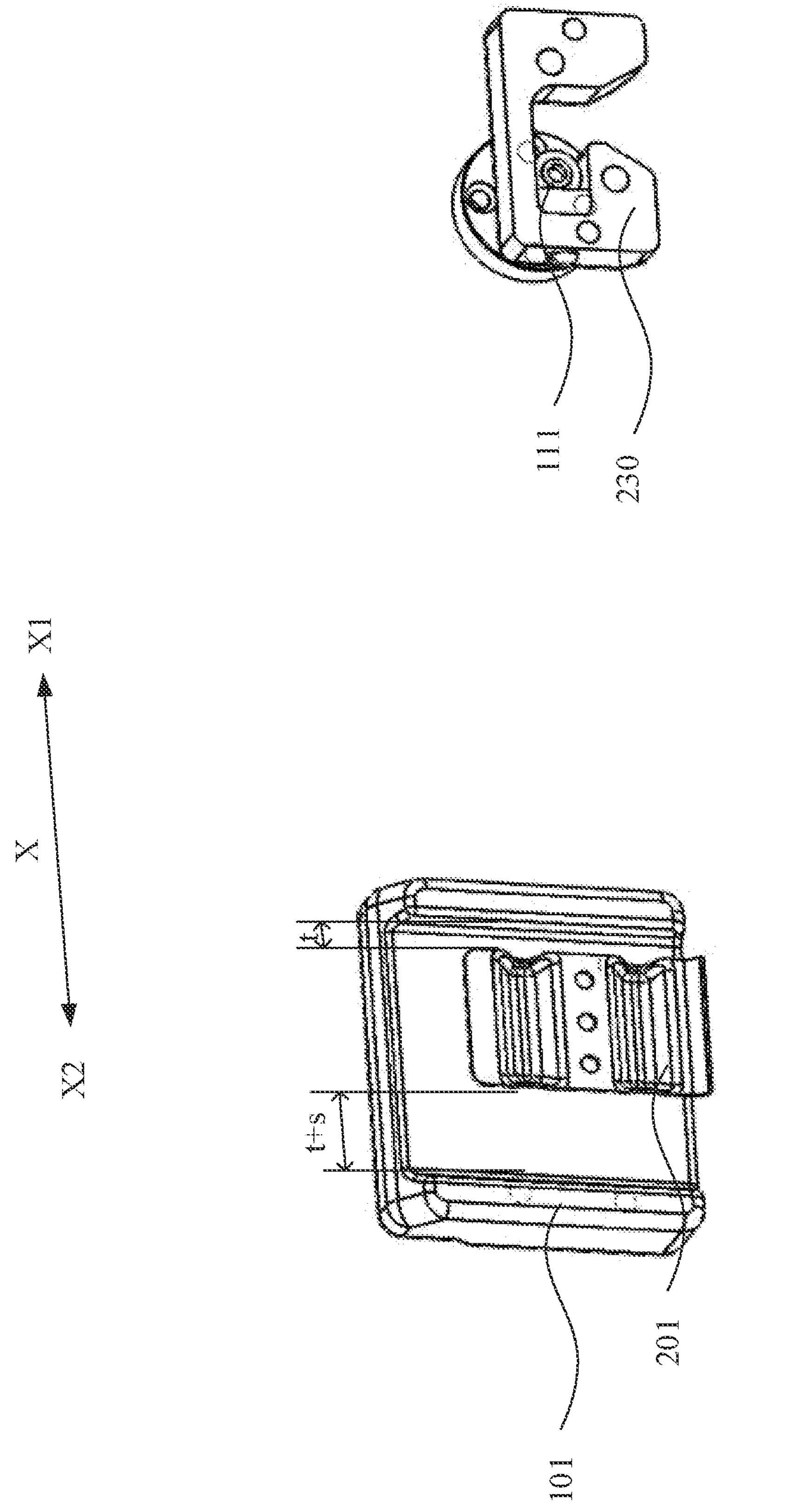
FIG. 19 is a fourth schematic diagram illustrating a relative changing status of a cooperating relationship between an elastic member and a limiting member and a cooperating relationship between a lock base and a lock shaft according to an embodiment of the present invention.

As shown in FIG. 19, the battery pack 100 generates a displacement in the X direction relative to it of FIG. 18. The locking shaft 111 moves a distance s in the locking section 234 of the lock groove 231 in the X direction relative to it of FIG. 18, and stops at the locking position 236. At the same time, the limiting member 101 moves a distance s along the X direction with the X direction displacement of the battery pack 100, due to the distances between the two side edges of the elastic member 201 and the guide surface 104 of the limiting member 101 are respectively t and t+s, while the distance t+s is arranged at the X1 direction side of the elastic member 201 in FIG. 19, while the limiting member 101 moves towards the X2 direction with the lock shaft 111, the gap of the elastic member 201 at the X1 direction side is shortened by s, making in FIG. 19, the gap of the elastic member 201 at the X2 direction side becomes t+s, the gap at the X1 direction side becomes t, ensuring the distance between the two side edges of the elastic member 201 and the guide surface 104 of the limiting member 101 is always greater than t when the battery pack 100 is in a process of mounting to the quick-change support 200, ensuring that the elastic member 201 and the limiting member 101 will not collide or be stuck with each other, hindering the mutual cooperation between the lock shaft 111 and the base seat 230.

The X, Y, and Z directions in figures are for facilitating an illustration of orientations of members in different figures, and therefore, should not be construed as limiting the present invention.

In the description of the present invention, it is to be understood that the terms “upper”, “lower”, “front”, “rear”, “left”, “right”, “vertical”, “horizontal”, “top”, “bottom”, “inner”, “outer”, or the like indicate orientations or positional relationships based on orientations or positional relationships of devices or elements when are in practical uses, are merely for convenience in describing the present invention and to simplify the description, and do not indicate or imply that the referenced devices or elements must have a particular orientation, be constructed and operated in a particular orientation at all moments, and thus are not to be construed as limiting the present invention on these aspects.

Though embodiments of the present invention have been described above, it will be understood by a person skilled in the art that this has been done by way of example only, and the scope of the invention is to be determined by the claims that follow. Various changes or modifications to these embodiments may be made by a person skilled in the art without departing from the principle and spirit of this invention, and these changes and modifications are within the scope of this invention.

What is claimed is:

1. A limiting guide device, wherein, it comprises an elastic member and a limiting member, the limiting member is used to cooperate with the elastic member, the elastic member is disposed to one between the inner side wall of a quick-change support and the outer side wall of a quick-change battery box, and the limiting member is arranged to the other one between the inner side wall of the quick-change support and the outer side wall of the quick-change battery box;

wherein the elastic member is used for elastically limiting the movement of the quick-change battery box in the quick-change support;

wherein the elastic member comprises a mounting portion and a protruded portion, the mounting portion is used to mount the elastic member to the inner side wall of the quick-change support or the outer side wall of the quick-change battery box, and the protruded portion is extended and protruded relative to the mounting portion in a direction that is facing away from the inner side wall of the quick-change support or the outer side wall of the quick-change battery box wherein the limiting member comprises a positioning surface and a guide surface, the positioning surface is used to abut against the protruded portion of the elastic member in a direction that the protruded portion is protruded, and the guide surface extends and protrudes outward from the positioning surface.

2. An electric automobile, wherein, it comprises a quick-change support, a quick-change battery box and the limiting guide device according to claim 1, an outer wall of the quick-change battery box is disposed with one or a plurality of the elastic members or the limiting member, when the elastic member is disposed to one between the quick-change support and the battery box, the limiting member is disposed to the other one between the quick-change support and the battery box.

3. The electric automobile according to claim 2, wherein, when the quick-change battery box is loaded into the quick-change support, the elastic member is extruded by the limiting member to deform, and/or, a pre-compressed dimension of the elastic member is e, a thickness of the elastic member is c, a groove depth of the limiting member is d, wherein, c=d+e;

wherein, the pre-compressed dimension is an amount of compression of the elastic member when the quick-change battery box is loaded into the quick-change support.

4. The electric automobile according to claim 2, wherein, the limiting member comprises a positioning surface and a guide surface, the positioning surface is used to abut against the elastic member, the guide surface extends and protrudes outward from the positioning surface;

the limiting member comprises at least two of the guide surfaces, two of the guide surfaces are respectively oppositely disposed to the two sides of the positioning surface, and extend along the vertical direction, a sliding passage is formed between the guide surface and the positioning surface for the elastic member to slide into;

wherein:

a distance between the side edge of the elastic member and the guide surface is a reserved gap t, a width of the elastic member is a, a horizontal battery swapping stroke of the quick-change battery box is s, and a distance between the guide surfaces is b, b=a+2t+s, and/or, the battery box is disposed with a lock shaft, the quick-change support is disposed with a lock base, inside of the lock base is disposed with a lock groove for engaging with the lock shaft, the lock groove comprises a rising section and a locking section, the locking section extends horizontally from the rising section toward a locking direction, when the lock shaft is located at the rising section, the distance between the elastic member and the guide surfaces of the limiting member facing to the locking direction is greater than the distance for the lock shaft moving from the rising section to a locked position in the locking section.

5. The electric automobile according to claim 2, wherein, when the quick-change battery box is loaded into the quick-change support, a gap between the outer side wall of the quick-change battery box and the inner side wall of the quick-change support is K, a thickness of the limiting member is F, and K−F is greater than 0 and less than 2 mm.

6. The limiting guide device according to claim 1, wherein, the protruded portion has an upper inclined surface and a lower inclined surface that are oppositely arranged, and the upper inclined surface and the lower inclined surface are inclinedly arranged from the protruded end of the protruded portion toward the mounting portion.

7. The limiting guide device according to claim 1, wherein, the protruded portion has a left inclined surface and a right inclined surface that are oppositely arranged, and the left inclined surface and the right inclined surface are inclinedly arranged in a direction from the protruded end of the protruded portion toward the mounting portion.

8. The limiting guide device according to claim 1, wherein, the elastic member comprises at least two of the protruded portions distributed along the vertical direction.

9. The limiting guide device according to claim 8, wherein, the mounting portion is disposed between two of the adjacent protruded portions.

10. The limiting guide device according to claim 1, wherein, at least one of an upper end and a lower end of the elastic member is a free end.

11. The limiting guide device according to claim 1, wherein, the elastic member further comprises a snap-fit portion, the snap-fit portion is disposed at the top or bottom of the elastic member, the snap-fit portion is formed as bending towards the inner side wall of the quick-change support of the electric automobile or the outer side wall of the quick-change battery box of the electric automobile.

12. The limiting guide device according to claim 1, wherein, the elastic member is fixed to the inner side wall of the quick-change support or the outer side wall of the quick-change battery box of the electric automobile by means of a threaded member.

13. The limiting guide device according to claim 1, wherein, the limiting member comprises at least two guide surfaces, two of the guide surfaces are respectively oppositely disposed to the two sides of a positioning surface, and extend along the vertical direction, and a sliding passage is formed between the guide surface and the positioning surface for the elastic member to slide into.

14. The limiting guide device according to claim 1, wherein, a connecting surface is disposed in between the guide surface and the positioning surface, and the connecting surface is a curved-shaped surface.

* * * * *